Jan. 3, 1933.  N. A. HALLWOOD  1,892,729
SCALE
Filed May 9, 1931
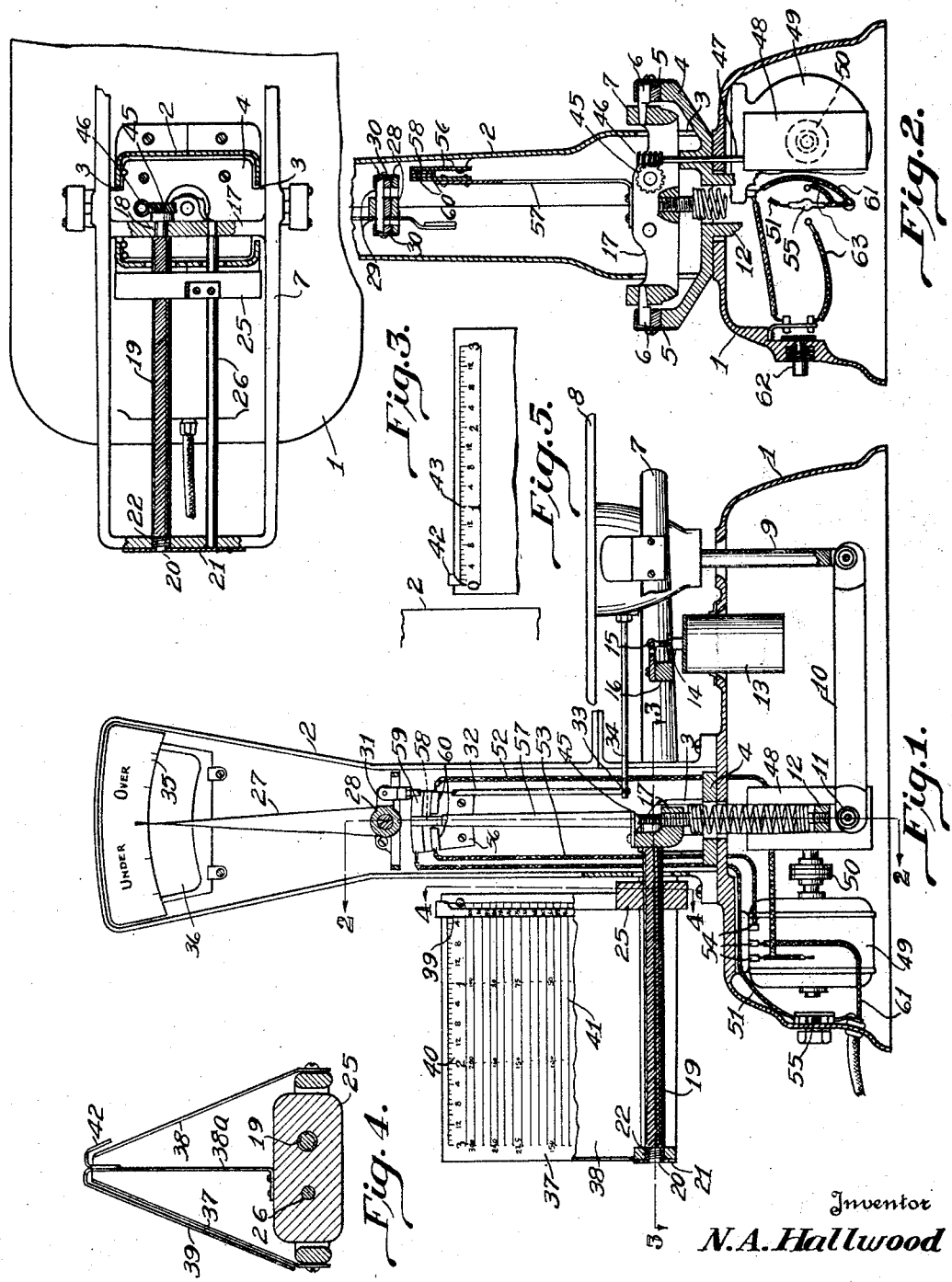
Inventor
*N. A. Hallwood*
By *W. S. McDowell*
Attorney Patented Jan. 3, 1933

1,892,729

UNITED STATES PATENT OFFICE

NATHAN A. HALLWOOD, OF COLUMBUS, OHIO

SCALE

Application filed May 9, 1931. Serial No. 536,225.

This invention relates to improvements in weighing scales of the so-called even balance type wherein the scale beam is pivotally mounted intermediately of its ends from the stationary scale base and wherein the beam, on one side of its pivotal or fulcrum mounting receives a known weight and on the opposite side of said mounting receives the commodity to be weighed or the unknown weight, the said beam when balanced providing for proper weight indication.

The present invention constitutes the continuation in part of the disclosures set forth in my copending application, Serial No. 484,973 filed September 29, 1930.

In my aforesaid application, there is set forth an even balance scale of the character referred to but wherein the known weight is mounted on the scale beam on one side thereof and provided with means for adjusting the weight longitudinally of the beam toward and away from its fulcrum mounting on the base, whereby the scale may be employed for weighing commodities of varying weights without employing the usual removably applied fixed or known weights, which have heretofore been characteristically employed in even balance scales. In my aforesaid application, the adjustable weight has its effective positions on the beam controlled by manually operated devices and I have found that to adjust the weight manually to its varying positions, the operation requires some considerable time which somewhat retards the rapid use of the scale in performing successive weighing operations.

Accordingly, it is an outstanding object of the present invention to provide means for automatically shifting or causing longitudinal travel of the known weight relative to the scale beam together with associated switch mechanism which functions to arrest traveling of the known weight when the scale beam is in proper balance with the commodity being weighed. It is another object of the invention to operate the aforesaid switch mechanism by means connected directly with the scale beam and moving about the fulcrum axis thereof.

It is a further object of the invention to provide an automatic weighing scale of the even balance type by which successive weighing operations may be rapidly and accurately carried out and at the same time price values determined by reference to the automatic calculator which is actuated through the medium of the traveling known weight.

With these and other objects in view, which will appear as the description proceeds, the invention consists in the novel features of construction, combination of elements and arrangements of parts hereinafter fully described and pointed out in the appended claims.

In the accompanying drawing:

Fig. 1 is a view in vertical section of a weighing scale constructed in accordance with the features of the present invention;

Fig. 2 is a vertical transverse sectional view taken through the scale on the line 2—2 of Fig. 1;

Fig. 3 is a horizontal sectional view taken through the weighing beam structure of the scale on substantially the plane indicated by the line 3—3 of Fig. 1;

Fig. 4 is a transverse vertical sectional view on the plane indicated by the line 4—4 of Fig. 1; and Fig. 5 is a fragmentary view of the rear face of the indicating chart.

Referring more particularly to the drawing, the numeral 1 designates the base of my improved scale. Arranged on the top of the base is an open bottom weight indicating tower 2. Also, supported by the base 1 and extending through openings 3, formed in the side walls of the tower 2, is a stationary yoke 4. This yoke has its transversely spaced upstanding outer portions provided with bearing blocks 5, which are adapted to receive the knife edge fulcrums 6 projecting horizontally and rigidly from the opposite sides of a substantially rectangular beam 7. The fulcrums 6 are located approximately in the center of the length of the beam so that the latter may oscillate to a limited extent in a vertical plane, and in the ordinary manner.

The outer end of the beam 7 pivotally supports a weight receiver 8, which is adapted for the reception of the unknown weights, that is to say, the commodities which are to be weighed on the scale. This weight receiver is pivotally fulcrumed as usual on the beam 7 and includes the usual downwardly projecting stem 9 which terminates within the base 1 of the scale. A check rod 10 is pivotally connected at one end with the lower extremity of the stem 9 while the other end of the rod 10 is pivotally connected as at 11 with a vertically depending arm 12 unitarily formed with and depending from the yoke 4. A dashpot 13 is stationarily carried by the base of the scale and the reciprocating piston rod 14 of the dashpot is pivotally connected as at 15 with a cross member 16 of the beam 7.

The scale beam is provided with a centrally disposed rigid cross member 17 which extends through the openings 3 and provided in the lower part of the tower 2 secured to the upper surface of this cross member, as shown in Fig. 3 is a bracket 18 which rotatably receives, in an opening formed at one side thereof, the reduced unthreaded end of a weight adjusting screw 19, the opposite end of the screw being likewise journalled as at 20 in a bearing formed in a strap 21 rigidly attached to the outer marginal surfaces of the beam. Preferably, there is a coil spring 22 disposed around the latter end of the screw 19 which exerts sufficient frictional pressure on said screw to maintain the same stationary against accidental rotation. The screw shaft 19 extends longitudinally of the beam and is provided with coarse threads having a wide lead which provide for the rapid longitudinal shifting of an adjustable weight 25 which is carried by the screw shaft 19 and a companion parallel shaft 26. The shafts 19 and 26 are slightly spaced in a transverse direction from each other and to provide for the movable support of the weight 25 and to permit of the adjustment of the latter lengthwise of the beam. Thus the capacity of the scale may be varied by shifting the weight 25 back and forth with reference to the pivotal axis of the beam 7. When the weight is arranged adjacent the pivotal center, as shown in Fig. 1, the beam will be in balance but as the weight is moved outwardly away from such pivotal center, the beam becomes unbalanced and lowered on the fixed weight side. The greater the distance the weight 25 is shifted from the pivotal axis of the beam, the greater the weighing capacity of the scale will be. Thus in the particular form of the scale illustrated, when the weight 25 is at the extreme position of outward movement away from the beam axis, commodities may be weighed on the platter 8 having for example approximately three pounds of mass or bulk. While the scale is admirably suited for the weighing of articles possessing a weight not in excess of three pounds, nevertheless it will be appreciated that the construction and principles of the scale are such as to provide any other desired weighing capacity.

In order that weighing operations may be carried on with extreme accuracy, there is mounted in the tower 2 a secondary weight indicating mechanism comprising a pointer 27 which is formed with a hub 28. From this hub knife edge trunnions 29 project and are seated in stationary bearings 30 stationarily supported within the tower. The hub 28 is formed with a crank arm 31 and at the outer end of this arm is pivotally secured the upper end of a rod 32. The latter extends vertically within the tower 2 and has its lower end pivotally connected as at 33 with a horizontally extending arm 34 fixed to the out-rider or weight receiver 8. It will be seen that as the beam oscillates, the pointer 27 will rock back and forth over a graduated surface 35 formed in the upper portion of the tower 2 and which is visible through glazed sight openings 36 provided in conjunction with the upper portion of the tower, producing the customary under and over readings. Due to the length of the pointer and the manner of effecting its movement, very slight movement on the part of the beam will be magnified and rendered clearly visible by reference to the position of the pointer on the graduated surface 35.

Secured to the beam 7 on the side of the latter opposed to the weight receiver is a pair of spaced and downwardly and outwardly inclined sheet metal plates 37, 38, and mounted on the adjustable weight 25 between these plates is an index 38a. One arm 39 of this index extends parallel with and across a weight indicating scale 40 and also over price computing indicia 41 applied to the outer surface of the plate 37. The other arm 42 of the index, as shown in Fig. 5, extends in cooperation with a scale 43 provided on the outer surface of the plate 38, the arm 42 and the scale 43 providing a customer's reading by which the operating positions of the weight 25 may be noted by the customer in determining the correctness of a given operation. Likewise the merchant's reading is obtained by the arm 39 and the scale 40 and, in addition, the merchant's side of the scale is provided with the price computing data 41 so that the scale operator or merchant may at a glance determine the setting of the weight 25 and the price per pound of the commodity weighed.

The screw 19 has fixed to one end thereof a worm gear 45 which is disposed in the pivotally arranged line of the beam so that the movement of the gear will be substantially nil when the beam oscillates through its limited amount of travel, which at the commodity receiver is not substantially in excess of three-thirty-seconds part of an inch. The worm gear 45 is engaged by a worm 46 carried by a vertically extending shaft 47 which extends upwardly from the base of the scale and is driven by a speed reducing mechanism, of any suitable type, arranged in a gear box 48, which is stationarily mounted in connection with the inner part of the base 1. In imparting motion to the shaft 47, use is made of a motor 49 which is connected by a slip clutch 50 with the driving shaft of the gear box 48. The motor 49 is of the reversible electric type and includes the customary three conductors 51, 52 and 53 which are connected with the terminals 54 of the motor. A manually operated snap switch 55 is connected with the base of the scale to control the operation of the electrical apparatus carried thereby. Mounted within the tower 2 adjacent to the hub 28 is a bracket 56 and movable with respect to this bracket is an upstanding switch arm 57, which has its lower ends secured to the rigid cross member 17 of the beam, so that the arm 57 oscillates in unison with the beam. The upper end of the arm 57 carries a contact strip 58 which is arranged in constant wiping contact with a bar 59 fixed to the upper edge of the bracket 56, and the conductor 51 is connected with the bar 59.

Also mounted on the bracket 56 but insulated from the bar 59 are spaced arcuate contacts 60—60, and these contacts are relatively spaced a sufficient distance so that they are not in engagement with the strip 58 when the beam 7 is in balance, as shown in Fig. 1.

In the operation of the scale, a commodity is placed on the weight receiving platter to be weighed in the usual manner. This results in the oscillation of the beam and its associated arm 57 which moves the strip 58 into engagement with one of the contacts 60, permitting current to pass by way of the conductor 51, through the bar 59, the strip 58 and thence by way of the contact 60 through the conductor 52 to the motor 49, energizing the motor, the current then passing through a return conductor 61. By energizing the motor, motion is imparted to the shaft 47, which revolves the screw shaft causing the known weight to move outwardly thereon, until the known weight assumes a position in balance with the weight of the applied commodity. As this condition is reached, the beam assumes a position of equilibrium which brings the strip 58 out of engagement with one of the contacts 60 and thereby interrupts the circuit to the motor. If the known weight should move beyond this position of balance with the commodity or if the commodity should be lighter than an initial position of the known weight on the screw shaft, the equilibrium is disturbed so that the arm 57 and the contact strip 58 oscillates into engagement with the other of the contact 60, which causes the flow of current through the conductor 51, the bar 59, the strip 58, the last named contact 60 and thence by way of the conductor 53 to the motor 49, which results in reversing the direction of rotation of said motor, as compared with the first named operation so that the direction of rotation of the screw shaft will be reversed to cause the travel of the known weight in a direction toward the fulcrum edges of the beam until the known and unknown weights are in equilibrium and the strip 58 brought to a position midway between the contacts 60.

Arranged in connection with the switch 55 is a second manually operated switch 62 which functions to complete the circuit for the motor 49 when the contact arm of the switch 55 is moved to a position breaking the circuit for the automatic switch controlled by the arm 57 and thereby joining the conductor 63 leading to the switch 62. By the operation of the latter switch, which is of the spring pressed push button type normally in a circuit opening position, the weight 25 may be moved to any predetermined position on the screw 19 and stopped there by the release of the switch. This manual control of the motor is further desirable when a plurality of successive weighing operations of equal value are carried out and thereby eliminate the necessity of having the weight moved back and forth for each successive operation. When such operations are completed the weight, of course, may be returned to the normal position by the turning of the switch 55 to a position closing the circuit controlled by the arm 57 and the scale will thus be in an operating position for automatic weighing.

The present invention thus provides an even balance scale having means for automatically shifting the known weight and for bringing the beam of the scale into a balanced position. It is in this respect particularly that the present invention provides an improvement upon the disclosures contained in my above identified application. The structural features of the invention are of course subject to considerable modification and I reserve the right to employ all such variations thereof which may be said to fall fairly within the scope of the following claims.

What is claimed is:

1. In a weighing scale, a base, a beam pivotally mounted on said base for limited oscillatory movement in a vertical plane, a weight receiver carried by said beam, a weight member shiftable longitudinally of and carried by said beam, motor operated means for effecting the movement of said weight, a switch automatically controlled by the movement of said beam for effecting the operation of said motor, and a manually controlled switch for breaking the circuit to said automatic switch and for closing a second circuit leading to said motor.

2. In a weighing scale, a base, a beam pivotally mounted on said base for limited oscillatory movement in a vertical plane, a weight receiver carried by said beam, a weight member shiftable longitudinally of and carried by said beam, motor operated means for effecting the movement of said weight, a switch automatically controlled by the movement of said beam for effecting the operation of said motor, and a pair of manually controlled switches for breaking the circuit to said automatic switch for effecting the closing of a second circuit leading to said motor whereby the motor may be controlled manually to bring the weight to a predetermined weighing position.

3. In a weighing scale, a base, a beam pivoted intermediate of its ends and mounted on said base, a weight receiver carried by one end of said beam, a weight carried by the opposite end of said beam and shiftable longitudinally thereof, motor operated means for effecting longitudinal movement of said weight, an indicating tower arising from said base, a switch for said motor within said tower, and a switch arm arising from the pivotal axis of said beam and operating to close and open said switch upon the movement of said beam.

4. In a weighing scale, a base, a beam pivoted intermediate of its ends and mounted on said base, a weight receiver carried by one end of said beam, a weight carried by the opposite end of said beam and shiftable longitudinally thereof, motor operated means for effecting longitudinal movement of said weight, an indicating tower arising from said base, a switch for said motor within said tower, and a switch arm arising from the pivotal axis of said beam for effecting the closing of the switch when the beam is in a position off balance and for opening said switch when said beam is in a balancing position.

In testimony whereof I affix my signature.

NATHAN A. HALLWOOD.